United States Patent
Lee et al.

(10) Patent No.: US 11,521,066 B2
(45) Date of Patent: Dec. 6, 2022

(54) METHOD AND APPARATUS FOR PARTITIONING DEEP NEURAL NETWORKS

(71) Applicant: ELECTRONICS AND TELECOMMUNICATIONS RESEARCH INSTITUTE, Daejeon (KR)

(72) Inventors: Chang Sik Lee, Daejeon (KR); Sung Back Hong, Daejeon (KR); Seungwoo Hong, Daejeon (KR); Ho Yong Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 524 days.

(21) Appl. No.: 16/830,253

(22) Filed: Mar. 25, 2020

(65) Prior Publication Data

US 2020/0311546 A1 Oct. 1, 2020

(30) Foreign Application Priority Data

Mar. 26, 2019 (KR) .................. 10-2019-0034381

(51) Int. Cl.
  *G06N 3/08* (2006.01)
  *G06N 3/04* (2006.01)
  *H04L 67/10* (2022.01)

(52) U.S. Cl.
  CPC .................. *G06N 3/08* (2013.01); *G06N 3/04* (2013.01); *H04L 67/10* (2013.01)

(58) Field of Classification Search
  CPC ............. G06N 3/08; G06N 3/04; H04L 67/10
  See application file for complete search history.

(56) References Cited

U.S. PATENT DOCUMENTS

| 2016/0379108 A1* | 12/2016 | Chung ................. G06N 3/0454 706/27 |
| 2017/0249387 A1* | 8/2017 | Hatami-Hanza ......... G06N 5/02 |
| 2018/0336076 A1 | 11/2018 | Lim et al. |
| 2018/0349313 A1 | 12/2018 | Ahn et al. |

(Continued)

FOREIGN PATENT DOCUMENTS

KR 1020180035073 A 4/2018

OTHER PUBLICATIONS

En Li et al., "Edge intelligence: On-demand deep learning model co-inference with device-edge synergy", SIGCOMM Workshop on Mobile Edge Communications, Aug. 21-23, 2018, pp. 1-10.

(Continued)

*Primary Examiner* — Minh Chau Nguyen
(74) *Attorney, Agent, or Firm* — Rabin & Berdo, P.C.

(57) ABSTRACT

A processor partitions a deep neural network having a plurality of exit points and at least one partition point in a branch corresponding to each of the exit points, for distributed processing in an edge device and a cloud. The processor sets environmental variables and training variables for training, selects an action to move at least one of an exit point and a partition point from a combination of the exit point and the partition point corresponding to a current state, performs the training by accumulating experience data using a reward according to the selected action and then moves to a next state, and outputs a combination of an optimal exit point and a partition point as a result of the training.

15 Claims, 9 Drawing Sheets

(56) References Cited

U.S. PATENT DOCUMENTS

2020/0082259 A1\*  3/2020  Gu ..................... G06N 3/0454
2020/0175361 A1\*  6/2020  Che ........................ G06N 5/04
2020/0210834 A1\*  7/2020  D'Ercoli ................ G06N 3/063

OTHER PUBLICATIONS

Surat Teerapittayanon et al., "Distributed Deep Neutral Networks over the Cloud, the Edge and End Devices", 2017 IEEE 37th International Conference on Distributed Computing Systems, Jun. 1, 2007, pp. 328-339.

Yiping Kang et al., "Neurosurgeon: Collaborative intelligence between the cloud and mobile edge", ASPLOS '17, Apr. 8-12, 2017, pp. 1-15.

\* cited by examiner

Distributed computing between
edge device and cloud

METHOD AND APPARATUS FOR PARTITIONING DEEP NEURAL NETWORKS

CROSS-REFERENCE TO RELATED APPLICATION(S)

This application claims the benefit of Korean Patent Application No. 10-2019-0034381, filed on Mar. 26, 2019, in the Korean Intellectual Property Office, the disclosure of which is incorporated herein by reference.

BACKGROUND

(a) Field

The present invention relates to a method and an apparatus for partitioning a deep neural network. In particular, the present invention relates to a method and an apparatus for partitioning a deep neural network based on reinforcement learning for optimal distributed computing in an edge computing environment.

(b) Description of the Related Art

A deep neural network (DNN) is composed of an input layer, an output layer, and a plurality of hidden layers existing therebetween, and requires complicated operation processes at many layers to derive a final result. Since the DNN requires a large amount of computation, storage space, and energy consumption in the operation processes, it is practically difficult to apply the DNN to an edge device that should support fast service with a limited computing resource and storage space.

To solve this problem, a distributed DNN (DDNN) structure where operation processes that had been processed through the conventional DNN are processed in a distributed manner between a cloud and an edge device was presented. In the DDNN structure, the edge device performs the operation processes up to only some layers of the DNN, then determines an inference result, and does not perform any more unnecessary operations if it is determined that the confidence of the inference result is satisfied to some extent. On the other hand, when more precise operations are required due to low inference confidence at the edge device, the cloud is configured to process subsequently. Thus, to put a stop to operation processes at the edge device, a procedure to transform the conventional DNN structure to have an exit point to should come first. The edge device calculates the inference confidence based on an intermediate operation result after performing the operation process up to previous layer of the exit point based on the pre-set exit point. When it is determined that the calculated inference confidence is higher than a predetermined threshold, a processed result is output and operation processes on subsequent layers are suspended. Such an output structure is referred to as a "local exit". Meanwhile, when it is determined that the inference confidence is lower than the threshold, the edge device transmits, to the cloud, the intermediate operation result obtained from processing up to the corresponding layer. After receiving the intermediate operation result from the edge device, the cloud infers a final result by performing operations from a subsequent layer to the last layer. Here, such an output structure is referred to as a "cloud exit". The introduction of the local exit has an effect of reducing inference latency without significantly deteriorating the inference accuracy. However, since the exit point is determined in a static manner in the existing techniques, it is necessary to adaptively determine the exit point in consideration of environmental variables such as computing resource utilization of a current edge device, network conditions, and the like.

In addition to such a local exit structure, a method for distributed computing between the edge device and the cloud is proposed, to minimize end-to-end latency of a service or energy consumption in the edge device. Through the proposed algorithm, an optimal partition point is determined among the plurality of hidden layers in DNN and the operation processes are performed by the edge device and the cloud in a distributed manner. In the proposed layer partitioning method, characteristics of not only a current load level in the cloud and bandwidth between the edge device and the cloud but also computational latency in each layer belonging to a specific DNN structure and output data size obtained as a result of operations are considered. Each layer belonging to the DNN has a different characteristic in the amount of computation required for operations and in the output data size, which affects determination of an optimal partition point according to the current load level in the cloud and the current network bandwidth. Therefore, to find the optimal partition point, a performance prediction model of delay or energy consumption should be made for each layer. To that end, profiling data for various configurations is performed by changing configuration variables such as input size, output size, the number of filters, filter size, and the like for each layer, and then a regression model is made. By using the regression model, performance of each layer for the DNN configuration is calculated and an optimal partition point is detected in consideration of current resource utilization, network bandwidth, and the like. Based on the detected partition point, the edge device performs operation processes on the front part layers and transmits an intermediate computation result to the cloud. After receiving the intermediate computation result, the cloud performs operation processes up to the last layer and transmits a final inference result to the edge device.

In recent studies, a method for selecting a local exit and a partition point all together to provide high inference accuracy while satisfying delay requirements of an application is proposed. To implement such a proposition, two steps of preprocessing are required. First, like a DDNN structure, a conventional DNN structure is modeled as a structure having multi-exit points by using BranchyNet that is an open source framework. Second, like a layer partitioning method, after profiling latency characteristics of each layer for various configurations, a regression model for performance prediction is generated based on the profiling. Then, during runtime, a combination having the highest inference accuracy is selected among combinations of the exit point and the partition point satisfying the delay requirements, based on situation variables such as the generated regression model of each layer, current network bandwidth, and the like.

However, in generating the regression model for predicting performance for each layer required by above-described conventional layer partitioning method, it is very cumbersome to separately adjust and profile configuration variables different in each layer. In addition, since it is difficult to identify complicated relationships among configuration variables, the regression model used to predict performance of each layer is insufficient to establish an accurate performance prediction model. Further, even in the same layer, the characteristics are different according to the DNN structure, and even in the same type of layer, the characteristics may vary according to the position where the layer is located.

SUMMARY

An embodiment of the present invention provides a method and an apparatus for partitioning a deep neural network that may eliminate complicated modeling processes used in conventional techniques to determine a local exit and a partition point in the inference process based on the deep neural network, and may effectively determine a local exit and a partition point through reinforcement learning.

According to an embodiment of the present invention, a method of partitioning a deep neural network having a plurality of exit points and at least one partition point in a branch corresponding to each of the exit points for distributed processing in an edge device and a cloud is provided, and the method is performed by a processor. The method of partitioning the deep neural network includes setting environment variables and training variables for training, performing training by receiving a reward as a result of a selected action in a current state and then moving to a next state, and outputting a combination of an optimal exit point and a partition point as a result of the training. Here, the state is defined as a combination of an exit point and a partition point, and the action is defined as a movement of the exit point or the partition point.

The method of partitioning a deep neural network may further include transmitting information on the combination of the optimal exit point and the partition point, to the edge device and the cloud.

An inference operation from an input layer up to a layer corresponding to the partition point in a branch corresponding to the optimal exit point may be performed in the edge device, and an inference operation from a layer subsequent to the layer corresponding to the partition point up to an output layer in the branch corresponding to the optimal exit point may be performed in the cloud.

The performing the training may include selecting an action in the current state based on experience data, receiving a reward as a result of the selected action, updating the experience data by accumulating the reward result of the action performed in the state, moving to a next state by performing the selected action, and determining whether the training is completed.

The selecting the action in the current state may include determining the action maximizing the reward based on the experience data in the current state.

The reward may be defined as a function of inference accuracy and inference latency in the edge device and the cloud.

The selecting the action in the current state may include determining whether the selected action is valid.

The environment variables may include at least one of input data, performance requirement in inference, network bandwidth between the edge device and the cloud, and resource utilization in the edge device.

According to another embodiment of the present invention, an apparatus for partitioning a deep neural network having a plurality of exit points and at least one partition point in a branch corresponding to each of the exit points is provided. The apparatus for partitioning the deep neural network may include a processor and an interface. The processor sets environmental variables and training variables for training, selects an action to move at least one of an exit point and a partition point from a combination of the exit point and the partition point corresponding to a current state, performs the training by accumulating experience data using a reward according to the selected action and then moving to a next state, and outputs a combination of an optimal exit point and a partition point as a result of the training. The interface transmits information on the combination of the optimal exit point and the partition point to an edge device and a cloud, for distributed processing of inference using the deep neural network.

An inference operation from an input layer up to a layer corresponding to the partition point in a branch corresponding to the optimal exit point may be performed in the edge device, and an inference operation from a layer subsequent to the layer corresponding to the partition point up to an output layer in the branch corresponding to the optimal exit point may be performed in the cloud.

The processor may determine the action in the current state which maximizes the reward, based on the experience data.

The reward may be defined as a function of inference accuracy and inference latency in the edge device and the cloud.

The reward may include a negative reward.

The processer may determine whether the selected action is valid, and receives the reward when it is determined that the selected action is valid.

The environment variables may include at least one of input data, performance requirements in inference, network bandwidth between the edge device and the cloud, and resource utilization in the edge device.

DETAILED DESCRIPTION OF THE EMBODIMENTS

Figure 1:
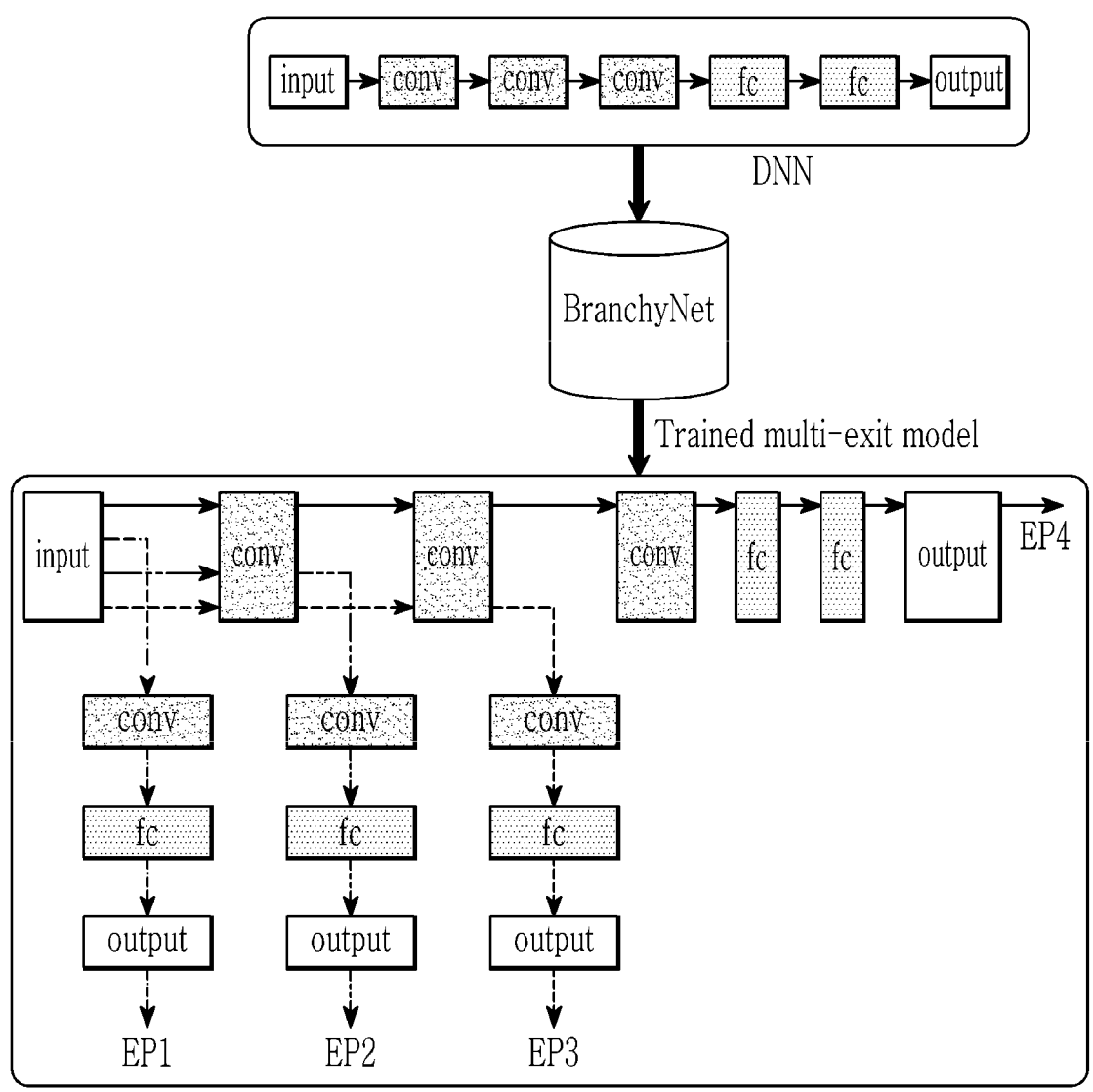
FIG. 1 is a diagram illustrating an example of a DNN modeled as a structure having multi-exit points using BranchyNet.

Hereinafter, embodiments of the present invention will be described in detail with reference to the attached drawings so that a person of ordinary skill in the art may easily implement the present invention. The present invention may be modified in various ways, and is not limited thereto. In the drawings, elements irrelevant to the description of the present invention are omitted for clarity of explanation, and like reference numerals designate like elements throughout the specification.

Throughout the specification and claims, when a part is referred to to "include" a certain element, it means that it may further include other elements rather than exclude other elements, unless specifically indicated otherwise.

Hereinafter, a method and an apparatus for partitioning deep neural networks according to some embodiments of the present invention are described in detail with reference to the accompanying drawings.

FIG. 1 is a diagram illustrating an example of a DNN modeled as a structure having multi-exit points using BranchyNet.

Referring to FIG. 1, a general DNN may be composed of an input layer, an output layer, and a plurality of hidden layers existing therebetween, and the plurality of hidden layers may include a convolutional (cony) layer and a fully-connected (fc) layer. For example, the hidden layers may be composed of 3 conv layers and 2 fc layers.

Such a DNN structure may be modeled as a structure having multi-exit points using BranchyNet. Here, the number of exit points may be arbitrarily set by a designer, and a plurality of branches are generated of as many as the number of exit points, and each branch is modified to have each of exit points EP1, EP2, EP3, and EP4. Each branch consists of a plurality of layers, and the layers in different branches do not overlap one another. The input layer is a layer for inputting data, and the output layer is located at the end of each branch to derive an inference result. Each of exit points EP1, EP2, EP3, and EP4 has different loss functions. The modified BranchyNet model is trained to minimize a weighted sum of the loss functions of each branch and determine the layer parameters.

Figure 2:
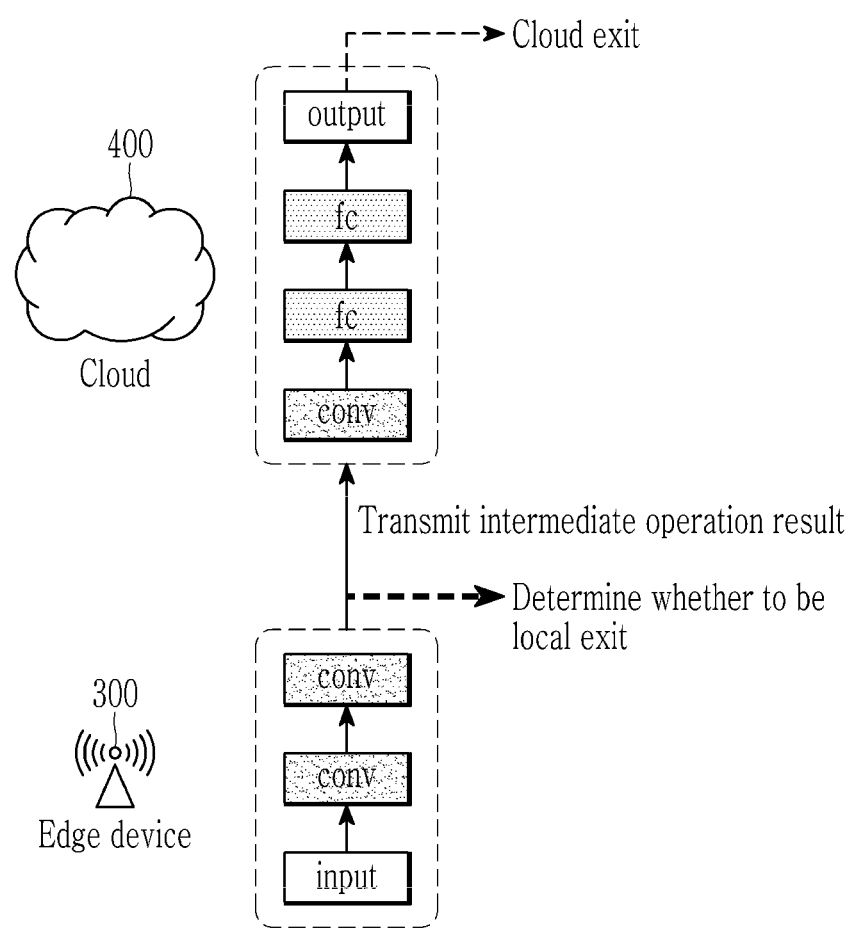
FIG. 2 is a diagram illustrating a distributed processing procedure between an edge device and a cloud based on a DNN structure having an exit point.

FIG. 2 is a diagram illustrating a distributed processing procedure to between an edge device and a cloud based on a DNN structure having an exit point.

Referring to FIG. 2, the edge device 300 performs operations up to a previous layer to an exit point EP in view of the exit point EP, and then calculates inference confidence based on the operation result. Next, the edge device 300 compares the calculated inference confidence with a predetermined threshold. If it is determined that the confidence is higher than the threshold, the edge device 300 outputs the processed operation result and stops operations of the layers subsequent the exit point EP. Such an output structure is referred to as a "local exit". If it is determined that the inference confidence is lower than the threshold, the edge device 300 transmits an intermediate operation result obtained by processing up to corresponding layer, to the cloud 400. Then the cloud 400 performs operations from a subsequent layer to the exit point EP up to a last layer, and infers and then outputs a final result. Such an output structure is referred to as a "cloud exit". An introduction of the local exit has the effect of reducing inference latency without significantly degrading the inference accuracy.

Here, an optimal partition point may be determined through layer partitioning in a branch corresponding to an exit point, and operation processes may be performed in a distributed manner between the edge device 300 and the cloud 400 by using the optimal partition point. The embodiment of the present invention may be applied to this case.

In a layer partitioning method, a computational latency of each layer in a specific DNN structure and a characteristic of an output data size resulting from operations, as well as a current load level in a cloud and a network bandwidth between a mobile terminal and the cloud, are considered. Each layer in the DNN has different characteristics in a computational amount required for operations and the output data size, which affects determination of an optimal partition point depending on the current load level in the cloud and the current network bandwidth. The edge device performs the operations on a previous layer to the partition point in the branch corresponding to the exit point based on the partition point, and transmits an intermediate operation result to the cloud. After receiving the intermediate operation result, the cloud performs operations from the subsequent layer to the partition point up to the last layer and then transmits a final operation result back to the edge device.

Figure 3:
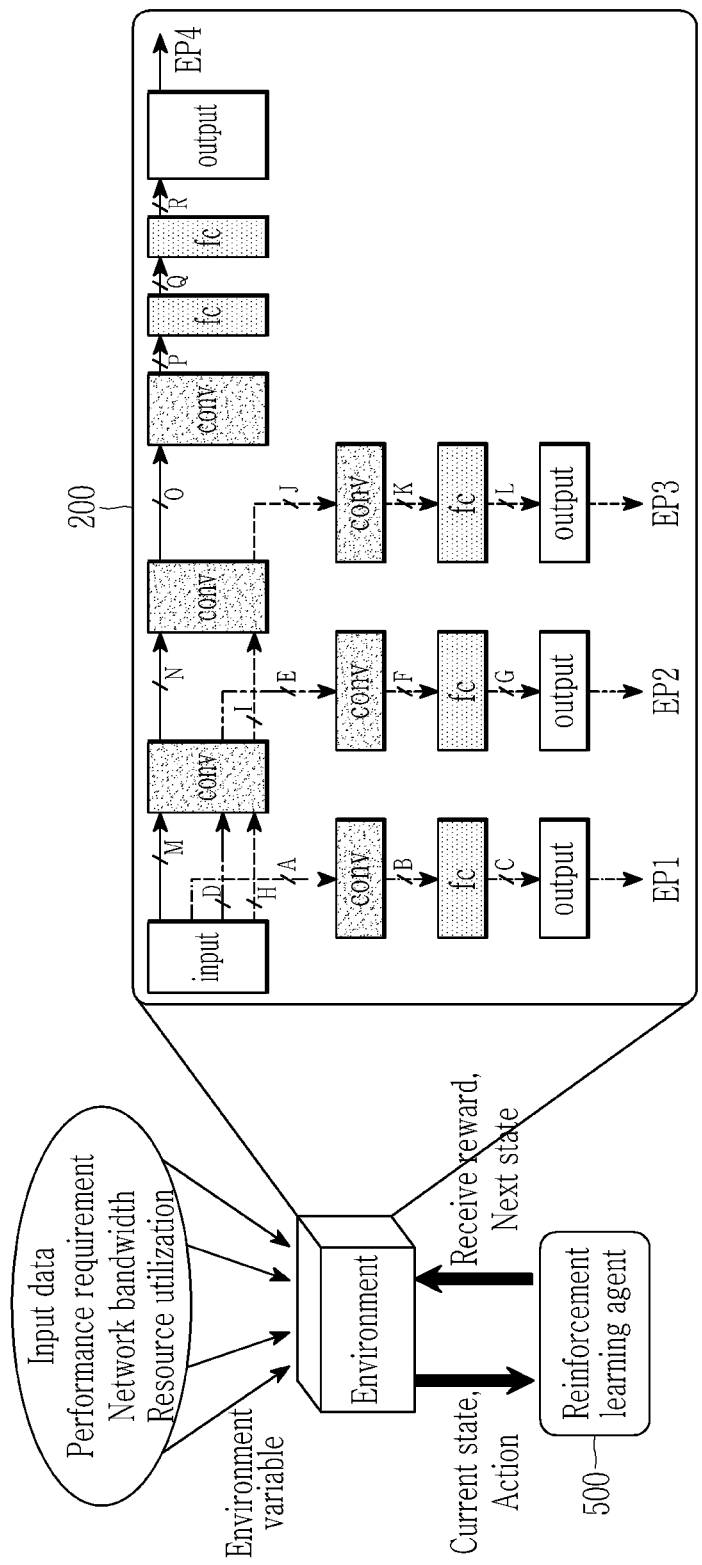
FIG. 3 is a diagram for explaining distributed computing between an edge device on a partition point and a cloud.

FIG. 3 is a diagram illustrating a reinforcement learning configuration for determining an exit point and a partition point based on a deep neural network according to an embodiment of the present invention.

Generally, reinforcement learning is a method that makes an agent autonomously learn which actions the agent should take to achieve a specific goal in any given environment. In the reinforcement learning structure 200 provided in an embodiment of the present invention, a learning goal of a reinforcement learning agent is to find an optimal exit point and a partition point in a given environment, and the reinforcement learning agent repeatedly performs a training process to achieve the learning goal.

Typical variables that consist of the learning environment of the reinforcement learning agent may include input data (input image) used for inference, performance requirements for inference, network bandwidth between an edge device and a cloud, and current resource utilization of the edge device. Performance requirements may include, for example, delay, energy consumption, or the like. The resource utilization of the edge device may include CPU utilization. In the training process, such environment variables constantly change and the reinforcement learning agent operates to select an optimal exit point and a partition point no matter what environment is given.

Besides the environmental variables, the factors involved in the reinforcement learning process are largely divided into a state, an action, and a reward. Here, the reinforcement learning agent 500 progresses a training process by performing a specific action in a current state, receives a reward as a result of the action, and moves to a next state. Through repeated training processes, the reinforcement learning agent 500 accumulates reward results of the actions performed in each state and generates experience data. Based on the experience data, the reinforcement learning agent 500 determines an action in the current state to maximize the reward.

In the embodiment of the present invention, each element is defined as follows.

First, in the embodiments of the present invention, the state is defined as a combination of {exit point, partition point} selected by a current reinforcement learning agent. That is, a selectable state of the reinforcement learning agent may be all the partition points except for an input layer and an output layer in each branch. Referring to FIG. 3, the number of selectable partition points in a first branch corresponding to a first exit point EP1 is three (A, B, and C). The number of selectable partition points in a second branch corresponding to a second exit point EP2 is four (D, E, F, and G). Further, the number of selectable partition points in a third branch corresponding to a third exit point EP3 is five (H, I, J, K, and L). Finally, the number of selectable partition points in a fourth branch corresponding to a fourth exit point EP4 is six (M, N, O, P, Q, and R). Thus, the number of selectable partition points in each branch is 3, 4, 5, and 6, respectively. Therefore, the DNN structure has 18(3+4+5+6) selectable states. That is, the total state space feasible in a multi-exit point based DNN structure is the sum of the number of selectable partition points in each branch. If the partition point is determined to be located prior to a first cony layer, all data is to be processed in the cloud. If the partition point is determined to be after a second fc layer, all data is to be processed by the edge device.

In order to briefly express the state represented by {exit point, partition point}, the exit points EP1, EP2, EP3, and EP4 are represented by 1, 2, 3, and 4, respectively. For each exit point, the partition point nearest to the input layer is represented by 1, and the number representing each of the partition points sequentially increases as to get closer to the output layer. For example, the states of the partition points D, E, F, and G corresponding to exit point EP2 may be represented by 1, 2, 3, and 4, respectively.

In an embodiment of the present invention, an action is defined as a movement of an exit point or a partition point. Through an action performed in a state {exit point, partition point} where the reinforcement agent is currently located, a movement to a next state {exit point, partition point} is made. Selectable actions in the current state include increasing or decreasing the exit to point, and increasing or decreasing of the partition point. That is, only one of the exit point and the partition point may be moved or both of them may be moved. For example, when moving from a state of {2,1} to a state of {2,2} in FIG. 3, the exit point does not change and only the partition point is increased by 1 as a result of the action. Moving from a state of {2, 1} to a state of {3, 2} is caused by an action of increasing both the exit point and the partition point by 1, respectively.

The training method of the reinforcement learning agent varies according to how the reward is to be given. According to an embodiment of the present invention, when distributed processing is performed between the edge device and the cloud in each state of {exit point, partition point}, the reward is represented by a function of inference accuracy and inference latency required during the process, as in Equation 1.

$$reward\_point = function\_a - function\_b \quad \text{[Equation 1]}$$

Here, reward_point is a reward, function_a is a function of inference accuracy, and function_b is a function of inference latency. The functions function_a and function_b used to obtain reward_point in Equation 1 are not designated as specific functions. Equation 1 means that the reward is designed to be proportional to the inference accuracy and to be inversely proportional to inference latency. In other words, to receive a high reward, the reinforcement learning agent is designed to find a combination of {exit point, partition point} with low inference delay while having comparatively reliable inference accuracy. By differently designing function_a and function_b as necessary, a tradeoff between the inference accuracy and the inference time may be adjusted. For example, for an application that requires high inference accuracy, by giving a large weight on the function_a, the inference accuracy may have a large effect on determining an act of the reinforcement agent. Oppositely, for an application that is very sensitive to the inference time, by giving a weight on the function_b, the reinforcement learning agent may find a combination of {exit point, partition point} with an emphasis on the inference time. In addition, when there is a latency requirement of an application, rather than an absolute value of the inference time, a relative value according to the latency requirement may be used as a factor of the function_b. Specifically, if it is determined that a current state of {exit point, partition point} cannot satisfy performance requirements of an application after performing inference, the reinforcement learning agent may be designed to receive a strong negative reward. Basically, since the reinforcement learning agent is trained to maximize rewards, the reinforcement learning agent is inclined to avoid such cases where strong negative rewards are granted. Thus, by incorporating a strong negative reward into a reward design, training is performed so that the reinforcement learning agent may find a combination of an exit point and a partition point where the performance requirement of an application is satisfied while relatively high inference accuracy is obtained. In an embodiment of the present invention, a performance metric is used as an example of the latency at reward designing, and a specific form of the reward function may vary depending on a target performance metric.

Figure 4:
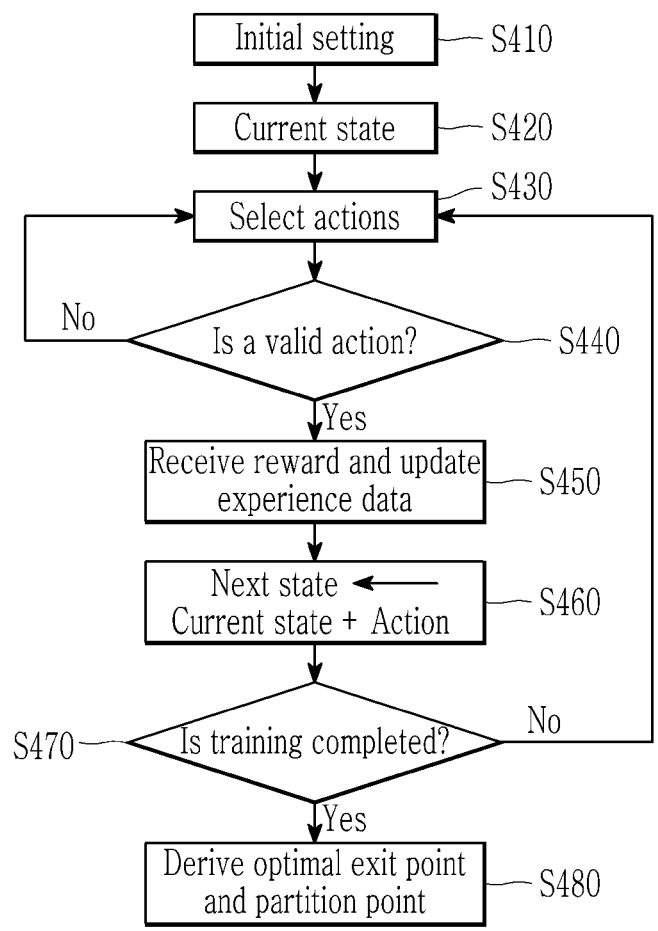
FIG. 4 is a flowchart showing a reinforcement training method of a reinforcement learning agent according to an embodiment of the present invention.

FIG. 4 is a flowchart showing a reinforcement training method of a reinforcement learning agent according to an embodiment of the present invention.

Referring to FIG. 4, a reinforcement learning agent establishes initial settings of environment variables and training variables (for example, learning rate, discount factor, etc.) for reinforcement training (S410), and performs training from an arbitrary initial state. Since there is no experience data at the beginning, an action is randomly selected. When the experience data is gradually accumulated through repeated training, the action is selected based thereon. The training variables may include, for example, a learning rate, a discount factor, and the like.

After selecting the action in a current state (S420, S430), the reinforcement learning agent determines whether the corresponding action is valid (S440). The process of determining the validity of the action is taken to avoid a case where the next state to which the current state moves as a result of the selected action does not exist. For example, when an action that causes decreasing of the exit point and increasing of the partition point is selected in FIG. 3, the next state becomes a state of {2,5}. However, the number of selectable partition points at the exit point corresponding to a second branch is four in the structure shown in FIG. 3. Therefore, the state of {2,5} deviates from possible state space in the corresponding structure, and such an action is considered to be invalid. If it is determined that the reinforcement learning agent selects an invalid action, another action is selected (S430). If the selection of an invalid action is repeated more than or equal to a predetermined number of times, the initial state is set again and the training process restarts.

Meanwhile, the reinforcement learning agent receives a reward for the next state when the selected action is valid, and updates the experience data by applying the received reward to the experience data for the action in the current state (S450).

After updating the experience data, the reinforcement learning agent actually performs the selected action to move to the next state (S460), and determines whether the training process is completed (S470). Various methods may be used to determine whether the training process is completed. For example, simply setting a limitation on learning time or the number of repetitions may be used. Further, when the number of times of staying at a same state becomes more than or equal to a certain number, the training process may be completed since it may be regarded as converging to an optimal state.

The reinforcement learning agent repeats the above-described process until the training is completed. When the training is completed, a final combination of the exit point and the partition point is derived as a training result (S480).

Figure 5:
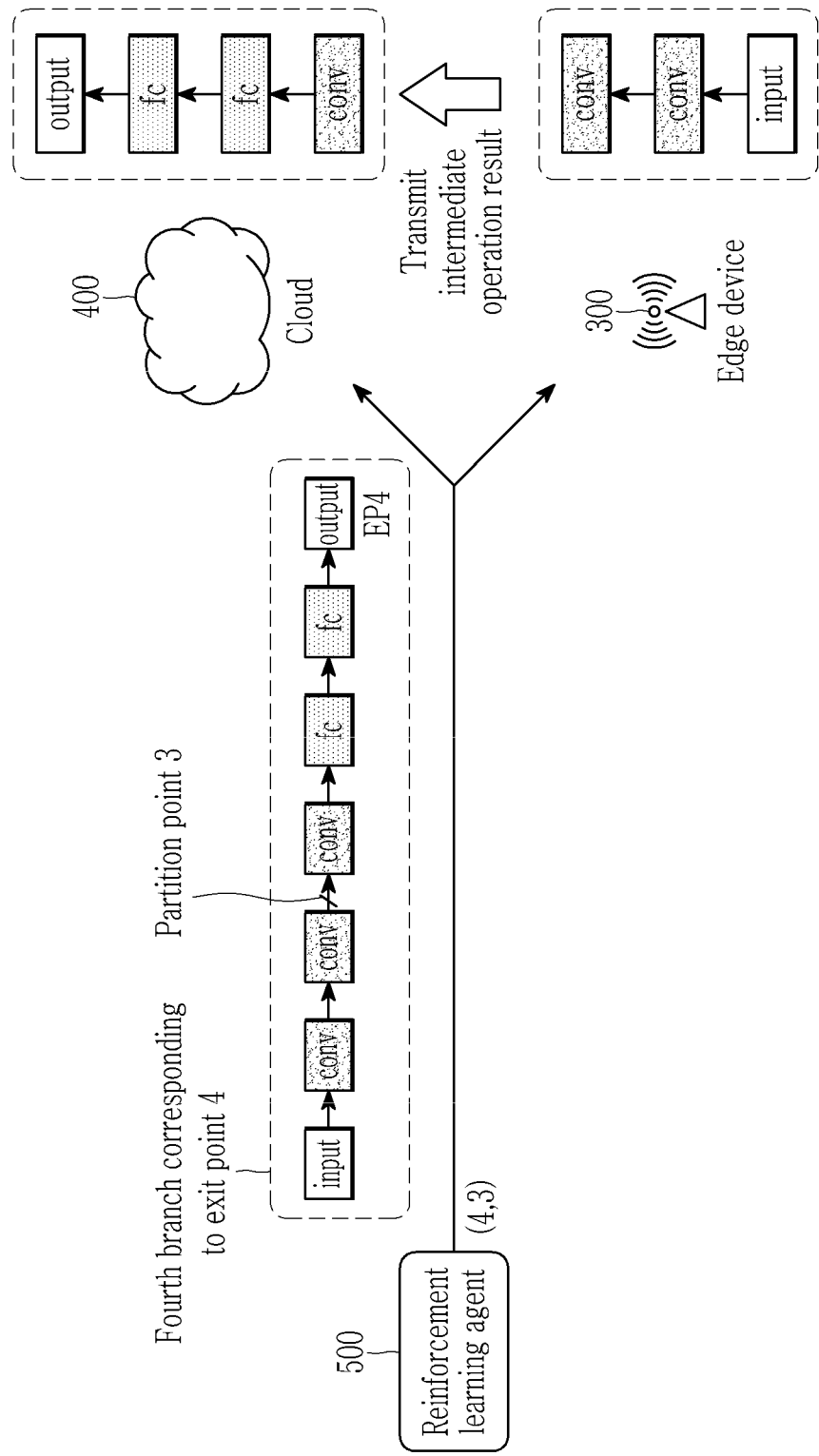
FIG. 5 is a diagram illustrating an inference process through distributed processing between an edge device and a cloud, based on an exit point and a partition point derived as a training result of a reinforcement learning agent, according to an embodiment of the present invention.

FIG. 5 is a diagram illustrating an inference process through distributed processing between an edge device and a cloud, based on an exit point and a partition point derived as a training result of a reinforcement learning agent, according to an embodiment of the present invention.

Referring to FIG. 5, information on a combination of {exit point, partition point} that is a training result of a reinforcement learning agent 500 is shared with an edge device 300 and a cloud 400. The edge device 300 performs operations from an input layer up to a layer corresponding to a partition point, for a branch corresponding to an exit point, based on the information on the combination of {exit point, partition point}, and the cloud 400 performs operations from the subsequent layer thereto up to an output layer. For example, when the training result of the processes shown in FIG. 4 is a combination of the exit point of 4 and the partition point of 3, the edge device 300 performs operations up to a second cony layer of a fourth branch and transmits the operation result to the cloud 400. The cloud 400 uses the operation result received from the edge device 300 as an input, and performs operations up to an output layer from a third cony layer that is subsequent to the second cony layer being a partition point. The final operation result processed up to the output layer by the cloud is provided to the edge device 300 or a user.

Figure 6A:
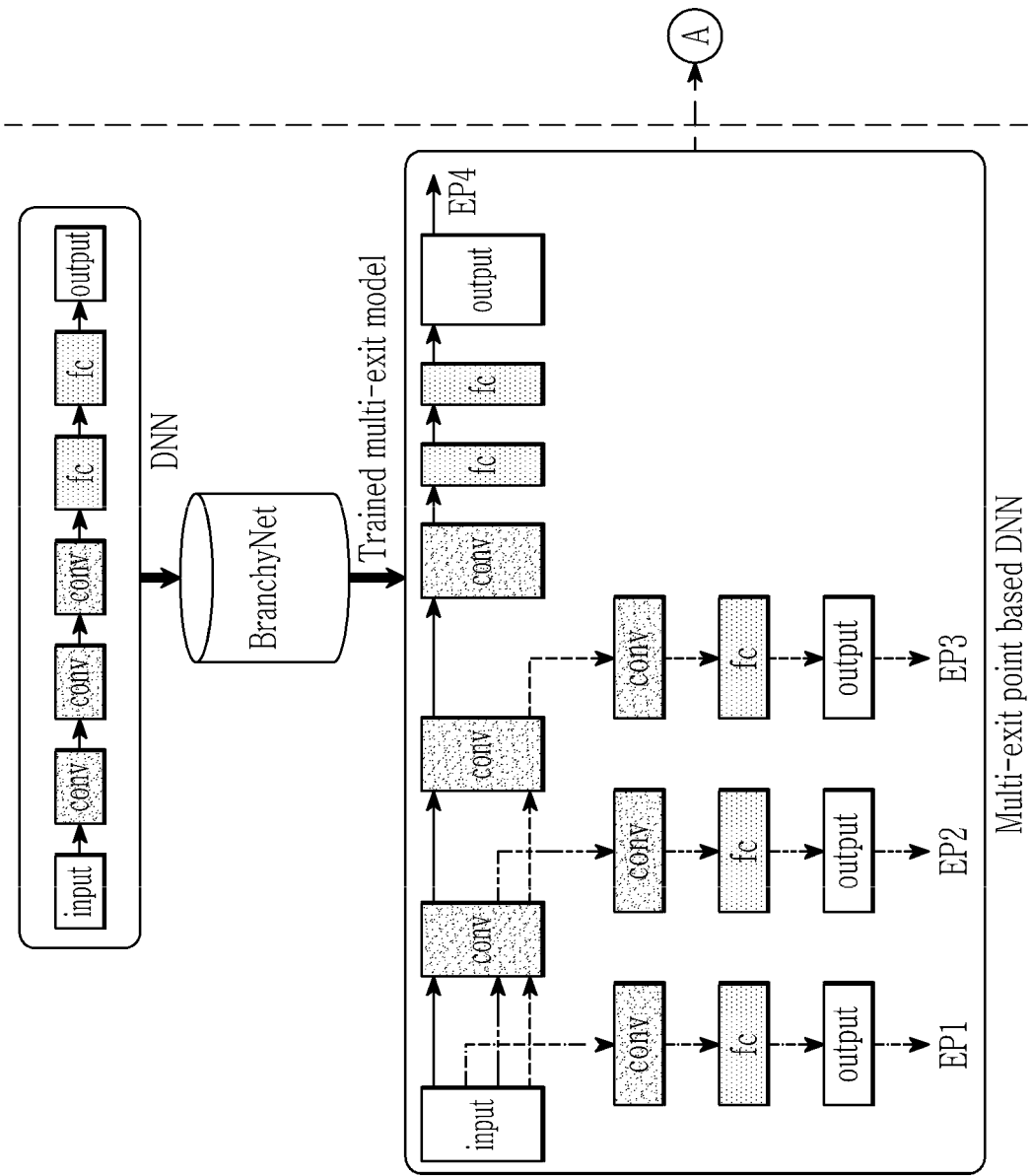
FIGS. 6A to 6C show a method of partitioning a deep neural network based on reinforcement learning for optimal distributed computing in an edge computing environment according to an embodiment of the present invention.
Figure 6B:
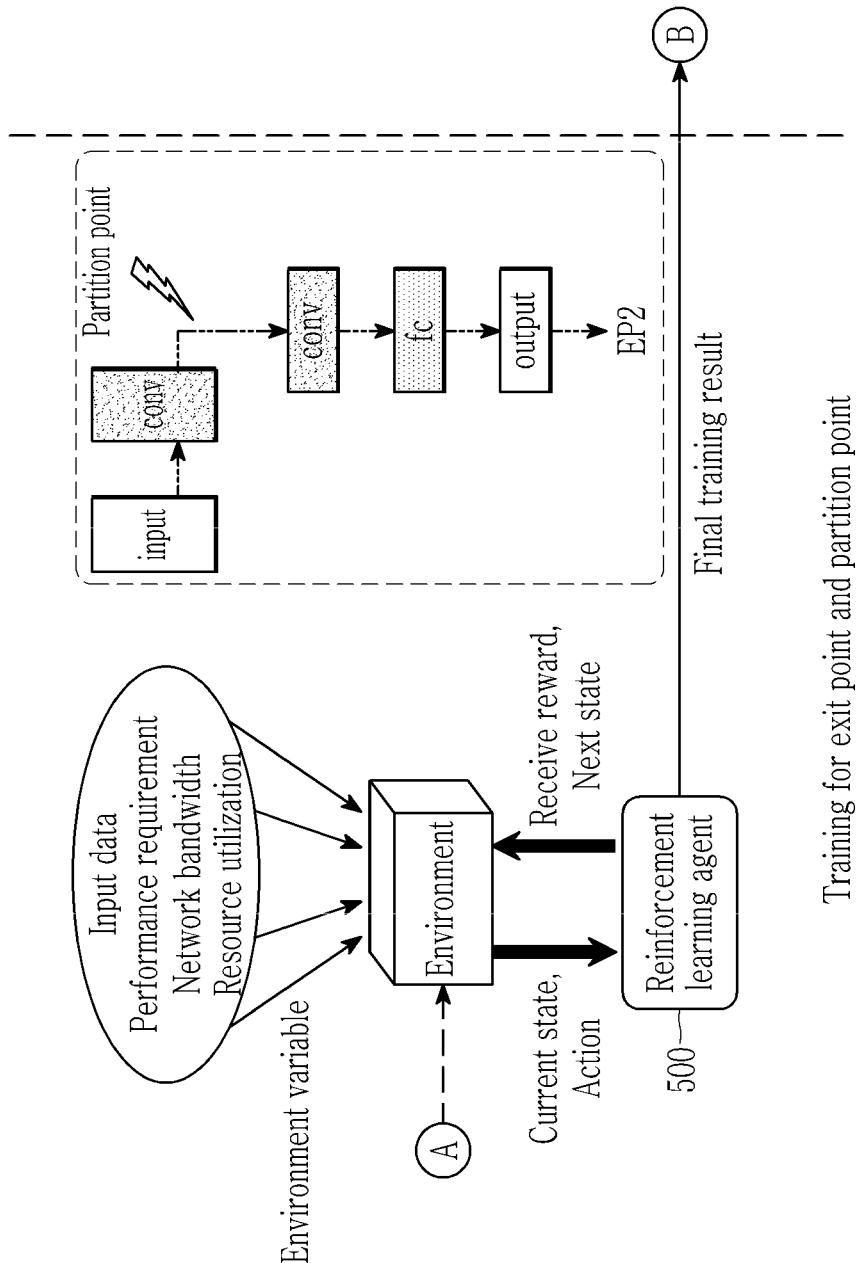
Figure 6C:
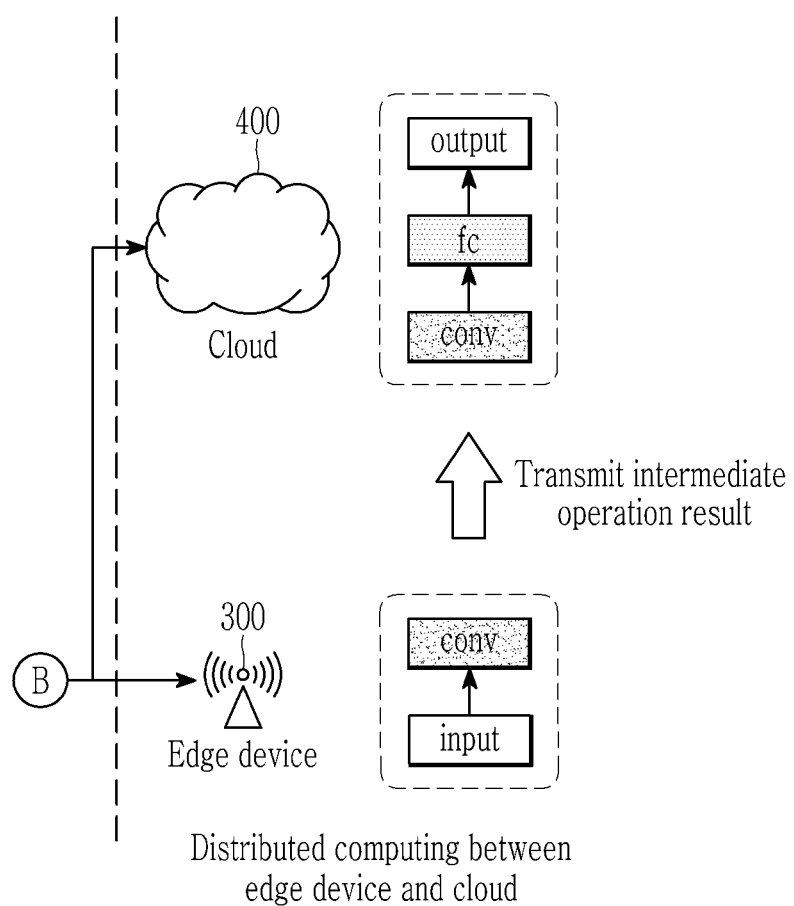

FIGS. 6A to 6C show a method of partitioning a deep neural network based on reinforcement learning for optimal distributed computing in an edge computing environment according to an embodiment of the present invention.

Referring to FIG. 6A and FIG. 6B, based on a multi-exit point based DDN structure modeled with BranchyNet, the reinforcement learning agent 500 performs training to determine an exit point and a partition point for achieving maximized rewards being a learning goal in a given environment, such as an input data, performance requirements, a bandwidth between an edge device and the cloud, current resource utilization, and the like. During the training process, when the reinforcement learning agent selects an action to move a specific point from a current state of {exit point, partition point} combination, the reinforcement learning agent accumulates experience data through rewards according to the actions and then moves to a next state. By being trained to select an act with a highest expected value of the acquirable reward in each state, the reinforcement learning agent may determine an optimal exit point and a partition point in any given environment. When the optimal exit point and the partition are determined as a result of the training, the reinforcement learning agent 500 transmits the result to the edge device 300 and the cloud 400.

Thereafter, as shown in FIG. 6C, a branch corresponding to the exit point is used in the inference process of the edge device 300 and the cloud 400. The edge device 300 performs operations from an input layer up to a layer corresponding to a partition point in a branch corresponding to an exit point, based on the partition point, and transmits the operation result to the cloud 400. After receiving the operation result from the edge device 300, the cloud 400 performs operations from the layer after the layer corresponding to the partition point up to an output layer using the received operation result. The cloud 400 completes the operation up to the output layer to obtain a final inference result, and transmits the final inference result to a user or the edge device 300.

Figure 7:
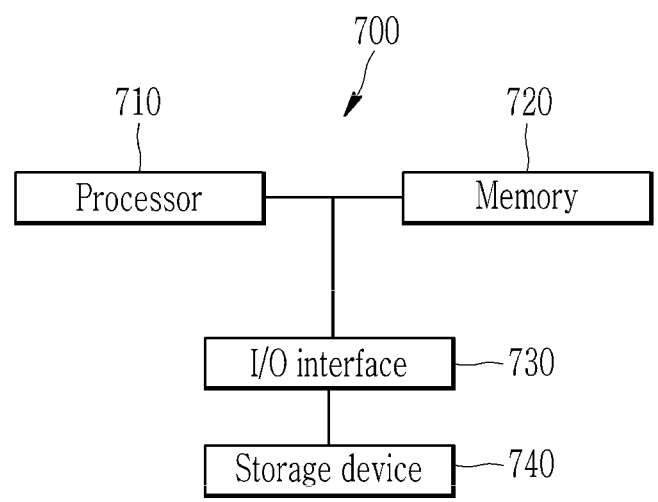
FIG. 7 is a schematic diagram illustrating a deep neural network partitioning apparatus according to an embodiment of the present invention.

FIG. 7 is a schematic diagram illustrating a deep neural network partitioning apparatus according to an embodiment of the present invention.

Referring to FIG. 7, the deep neural network partitioning apparatus 700 includes a processor 710, a memory 720, a storage device 730, and an input/output (I/O) interface 740. The deep neural network partitioning apparatus 700 may refer to a reinforcement learning agent 500, or may be implemented in the reinforcement learning agent 500.

The processor 710 may be implemented as a central processing unit (CPU), a variety of chipsets, a microprocessor, or the like.

The memory 720 may be implemented as a medium like a RAM such as a dynamic random access memory (DRAM), a rambus DRAM (RDRAM), a synchronous DRAM (SDRAM), a static RAM (SRAM), and the like.

The storage device 730 may be implemented as a permanent storage medium or a volatile storage medium such as a hard disk, a flash memory, a RAM of various types, and an optical disk including a compact disk read only memory (CD-ROM), a CD rewritable (CD-RW), a digital video disk ROM (DVD-ROM), a DVD-RAM, a DVD-RW disk, a blue-ray disk, or the like.

The above-described DNN structure based on a modeled multi-exit point and experience data may be stored in the memory 720 or the storage device 730.

The I/O interface 740 allows the processor 710 and/or the memory 720 to access the storage 730. In addition, the I/O interface 740 may provide an interface with the edge device 300 and the cloud 400.

The processor 710 may perform the deep neural network partitioning function described above with reference to FIG. 3 to FIG. 5 and FIG. 6A to FIG. 6C. Further, the processor 710 may load program instructions to implement the deep neural network partitioning function onto the memory 720, and may control to perform operations described above with reference to FIG. 3 to FIG. 5 and FIG. 6A to FIG. 6C. The program instructions may be stored in the storage device 730 or may be stored in another system connected via a network.

According to an embodiment of the present invention, an exit point and a partition point that maintain high accuracy while satisfying performance requirements such as delay, energy consumption, and the like is trained through reinforcement learning. Thus, complicated processes that profile characteristics such as the computational delay for each layer belonging to the DNN, output data size, and the like, and that generate prediction models one by one, may not be required.

In addition, by designing the reward as a function of inference accuracy and inference performance (latency, energy consumption, etc.), operators/users may easily identify tradeoffs between two factors and may control the training according to user preference through modifying the reward function.

Further, an embodiment of the present invention may be applied to various DNN structures instead of depending on a specific DNN structure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading to medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (08) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any to invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method, performed by a processor, of partitioning a deep neural network having a plurality of exit points and at least one partition point in a branch corresponding to each of the exit points for distributed processing in an edge device and a cloud, the method comprising:
    setting environment variables and training variables for training;
    performing training by receiving a reward as a result of a selected action in a current state and then moving to a next state; and
    outputting a combination of an optimal exit point and a partition point as a result of the training,
    wherein the state is defined as a combination of an exit point and a partition point, and the action is defined as a movement of the exit point or the partition point.

2. The method of claim 1, further comprising
    transmitting information on the combination of the optimal exit point and the partition point, to the edge device and the cloud.

3. The method of claim 2,
    wherein an inference operation from an input layer up to a layer corresponding to the partition point in a branch corresponding to the optimal exit point is performed in the edge device, and
    wherein an inference operation from a layer subsequent to the layer corresponding to the partition point up to an output layer in the branch corresponding to the optimal exit point is performed in the cloud.

4. The method of claim 1, wherein performing training comprises selecting an action in the current state based on experience data, receiving a reward as a result of the selected action, updating the experience data by accumulating the reward result of the action performed in the state, moving to a next state by performing the selected action, and determining whether the training is completed.

5. The method of claim 4, wherein selecting the action in the current state comprises determining the action maximizing the reward based on the experience data in the current state.

6. The method of claim 4, wherein the reward is defined as a function of inference accuracy and inference latency in the edge device and the cloud.

7. The method of claim 4, wherein selecting the action in the current state comprises determining whether the selected action is valid.

8. The method of claim 1, wherein the environment variables include at least one of input data, performance requirement in inference, network bandwidth between the edge device and the cloud, and resource utilization in the edge device.

9. An apparatus for partitioning a deep neural network having a plurality of exit points and at least one partition point in a branch corresponding to each of the exit points, the apparatus comprising:

a processor that sets environmental variables and training variables for training, selects an action to move at least one of an exit point and a partition point from a combination of the exit point and the partition point corresponding to a current state, performs the training by accumulating experience data using a reward according to the selected action and then moving to a next state, and outputs a combination of an optimal exit point and a partition point as a result of the training; and an interface that transmits information on the combination of the optimal exit point and the partition point to an edge device and a cloud, for distributed processing of inference using the deep neural network.

10. The apparatus of claim 9, wherein the reward is defined as a function of inference accuracy and inference latency in the edge device and the cloud.

11. The apparatus of claim 10, wherein the reward includes a negative to reward.

12. The apparatus of claim 9, wherein an inference operation from an input layer up to a layer corresponding to the partition point in a branch corresponding to the optimal exit point is performed in the edge device, and an inference operation from a layer subsequent to the layer corresponding to the partition point up to an output layer in the branch corresponding to the optimal exit point is performed in the cloud.

13. The apparatus of claim 9, wherein the processor determines the action in the current state which maximizes the reward, based on the experience data.

14. The apparatus of claim 9, wherein the processer determines whether the selected action is valid, and receives the reward when it is determined that the selected action is valid.

15. The apparatus of claim 9, wherein the environment variables include at least one of input data, performance requirement in inference, network bandwidth between the edge device and the cloud, and resource utilization in the edge device.

* * * * *